United States Patent [19]

Soltysik

[11] 3,931,946

[45] Jan. 13, 1976

[54] TERMINAL BLOCK MOUNTING BRACKET

[75] Inventor: Edmund John Soltysik, Chicago, Ill.

[73] Assignee: Illinois Tool Works Inc., Chicago, Ill.

[22] Filed: Jan. 23, 1975

[21] Appl. No.: 543,609

[52] U.S. Cl. .............. 248/68 R; 248/73; 248/223; 248/310; 174/72 A; 339/125 R
[51] Int. Cl.² ............... H02B 1/02; F16L 3/22
[58] Field of Search .......... 248/49, 65, 67.7, 68, 71, 248/73, 216, 220.5, 223, 361, DIG. 3, 309, 310, 314, 316 R, 316 D; 174/72 A, 138 D; 317/122; 339/91, 119, 125, 126, 128, 198 G, 198 GA; 179/98

[56] References Cited
UNITED STATES PATENTS

| 3,058,714 | 10/1962 | Oliver | 248/316 R X |
| 3,160,280 | 12/1964 | Burch | 339/198 GA |
| 3,402,907 | 9/1968 | Fisher | 248/223 |
| 3,443,783 | 5/1969 | Fisher | 248/220.5 |
| 3,518,618 | 6/1970 | Swanson | 339/125 R |
| 3,777,223 | 12/1973 | Chandler et al. | 174/72 A |
| 3,809,799 | 5/1974 | Taylor | 248/223 |

FOREIGN PATENTS OR APPLICATIONS

| 646,994 | 8/1962 | Canada | 248/316 D |

Primary Examiner—Roy D. Frazier
Assistant Examiner—Lawrence J. Staab
Attorney, Agent, or Firm—R. W. Beart; J. R. Halvorsen

[57] ABSTRACT

A one-piece bracket for retaining a rectilinear terminal block or the like in a stand-off position above a support panel. The bracket includes means for insuring aggressive gripping of the terminal block by the bracket.

16 Claims, 6 Drawing Figures

TERMINAL BLOCK MOUNTING BRACKET

BACKGROUND OF THE INVENTION

This invention relates to electrical terminal block apparatus and more particularly to the type of connector blocks which are used for interconnecting telephone circuits and more particularly the bracket means for mounting them. It is quite normal to provide either in a telephone exchange or in circuit rooms for office buildings a series of panels which support terminal connector blocks in which the various conductors are interconnected to the individual telephone stations. Typically, these connector blocks are fastened vertically to walls or panels and the various conductors brought into position with jumper wires forming the connection between the incoming conductors and the individual stations. Such an installation is shown in my co-pending U.S. Pat. application, Ser. No. 482,218, filed jointly with R. J. Lindeman and E. W. Reinwall.

Earlier art showing means for mounting such terminal blocks can be found in the U.S. Pat. Nos. to Burch, 3,160,280, Chandler, et al., 3,777,223 and Swanson, 3,518,618. Many of the devices contemplated by these earlier patents admittedly provide a snap means for interengagement with the terminal blocks or other apparatus. Generally, each of these devices utilizes a cam lead-in surface in conjunction with a shoulder and a suitable resilient means to retain the device in mounted position. In field usage it has been found that the elongated arms carrying the shoulder means are generally too resilient to adequately clamp the apparatus in mounted position and that vibration and pressure on the block, experienced during installation of the conductors, as well as other factors lead to the disengagement of the terminal blocks or apparatus from the mounting means.

SUMMARY OF THE INVENTION

It is an object of the present invention to provide a one-piece stand-off bracket which can be mounted on a supporting panel in a ready fashion which provides an open throat for laying in the conductors rather than threading them in the ends as in the prior art and an aggressive gripping of any one of a plurality of different sized terminal blocks.

Another object of the present invention is to provide a mounting bracket which includes its own fastening means for ready installation in a supporting panel.

Still another object of the present invention is to provide a one-piece plastic mounting bracket having unique characteristics in its configuration wherein not only will the tolerances of different types of connector blocks be tolerated by the bracket but wherein the installation of the terminal block brings about the desired function of aggressive gripping for positive retention.

Each of the above features can be found in the preferred embodiment of the present invention and, more particularly, the aggressive gripping of the terminal block as well as the acceptance of various tolerances in terminal block size, is accomplished by the unique wall structure and force relationship of the supporting flanges in their physical arrangement to the stiffly resilient shouldered arms. Pressure on the flanges results in the arms being aggressively urged inwardly for engagement with recesses on the terminal block.

DETAILED DESCRIPTION

Figure 1:
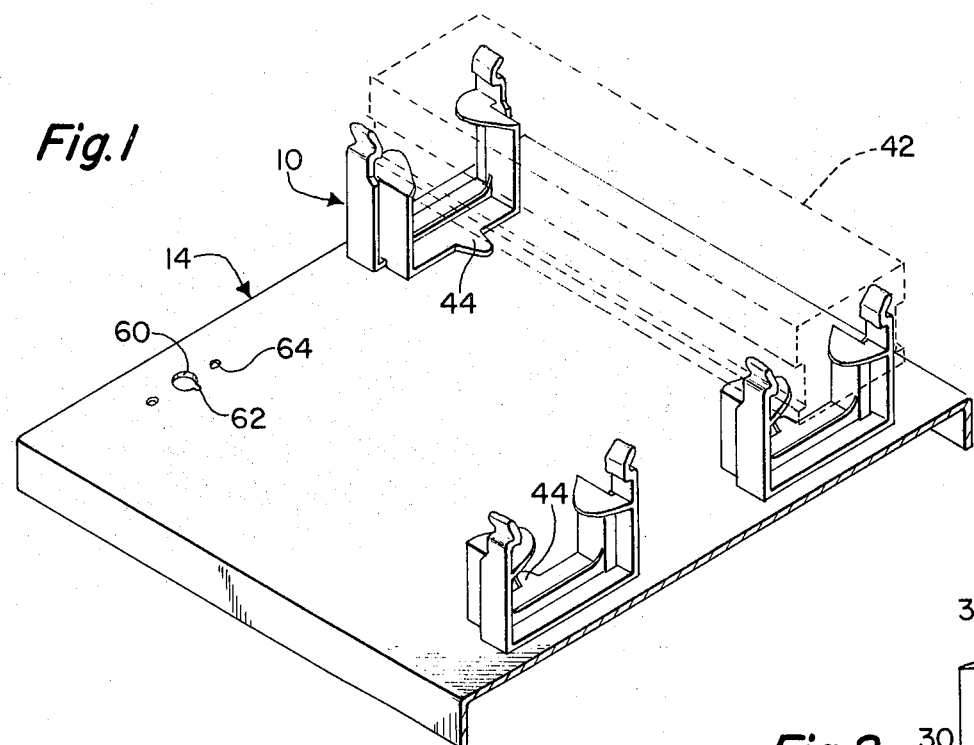
FIG. 1 is a perspective view in partial section showing the environment of a support panel and a plurality of brackets contemplated by the present invention mounted in position thereon.
Figure 2:
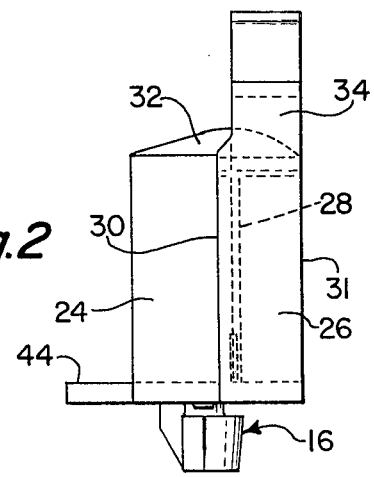
FIG. 2 is a side elevational view of the preferred embodiment of the present invention.

A preferred embodiment of a bracket for retaining a rectilinear terminal block or the like in a stand-off position above a support panel is generally designated by the numeral 10. Such a bracket includes a base 12 adapted to lie parallel to the panel 14 and a fastening means 16 extending downwardly from the base 12. While I have shown a fastening means covered by U.S. Pat. No. 3,423,055 it should be recognized that other suitable fastening means can be utilized. Examples of integral stud means are replete in the art and it should be recognized that this device can also be utilized with a screw, not shown, passing through the base 12. Extending downwardly from base 12 in the same direction as fastening means 16 are one or more protuberance means 18 in the form of detents adapted to fall into secondary apertures in the support panel 14 for preventing retrograde rotation after installation. Adjacent the outboard ends of the generally rectangular base 12 are pads 20 which serve a dual function, the first of which is to bow the base 12 and to insure proper engagement of the fastening means 16. The secondary function will be described hereinafter.

A pair of substantially rigid walls 22 extend upwardly from the base 12 in the opposite direction from the fastener 16. Each wall 22 includes a first portion 24 and a laterally offset second portion 26 which are interconnected by a co-extensive web 28, thereby forming an offset relatively rigid wall 22. It will be noted that the second portion 26 extends beyond its juncture with the web 28 to provide a segment 30 for purposes best set forth hereinafter.

Integrally connected to the wall 22, including both the first and second portions 24-26, is a flange 32 which is angularly disposed in a diverging fashion away from the base 12. It has a curvilinear configuration in this embodiment with the greatest amount of cantilever taking place approximately in line with the web 28 and thereby giving a relatively rigid structural configuration to flange 32.

Extending upwardly from wall 22 in the same direction from the base 12 are arms 34. The free end of the arms 34 is provided with a lead-in cam-like surface 36 which terminates in a shoulder 38 intermediate the extremities of the arm 34. A flat bearing surface 40 intermediate the cam lead-in surface 36 in the shoulder 38 is disposed substantially normal to the shoulder 38 to positively locate the shoulder relative to the recess in the terminal block 42 shown in phantom in FIG. 1.

Figure 4:
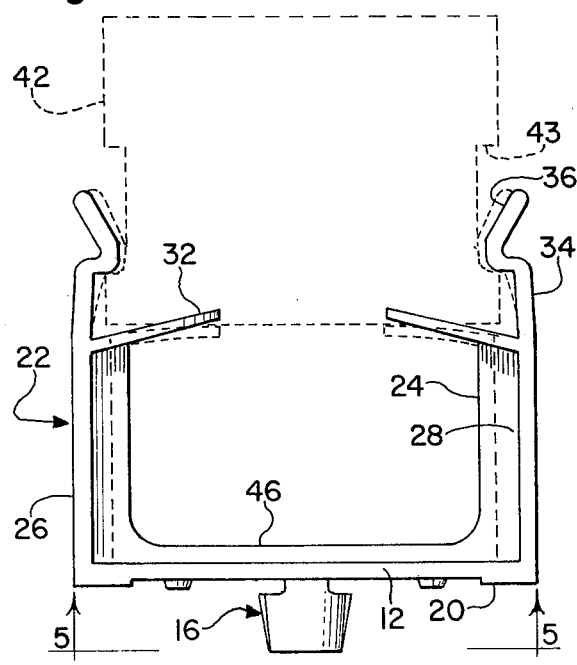
FIG. 4 is a rear elevational view of the bracket shown in FIG. 3.
Figure 3:
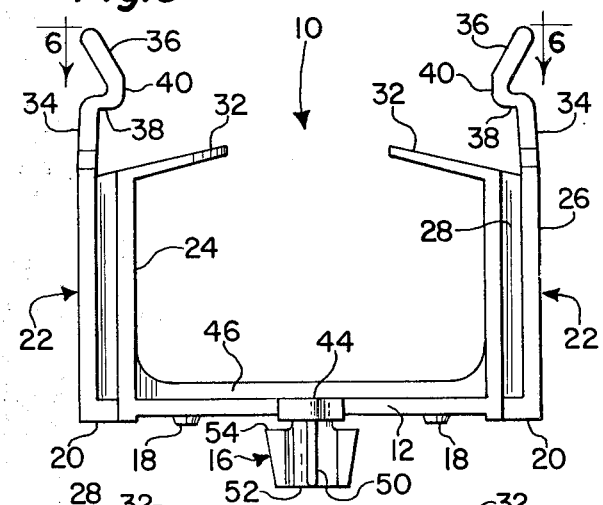
FIG. 3 is a front elevational view of the same embodiment.
Figure 5:
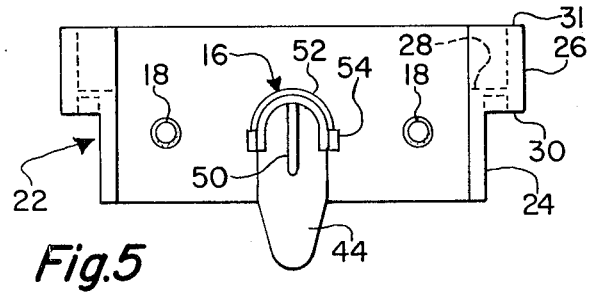
FIG. 5 is a bottom view of the same embodiment as viewed along lines 5—5 in FIG. 4.
Figure 6:
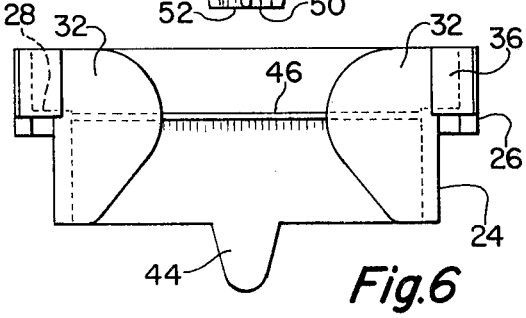
FIG. 6 is a top view as seen along lines 6—6 in FIG. 3.

When a terminal block is axially telescoped into the bracket 10, as shown in phantom in FIG. 4, the base of the block will ride down the lead-in surfaces 36 spreading the arms 34 outwardly until the base comes into contact with the flanges or support means 32. At that time, continued pressure will force the flanges downwardly, as shown in phantom in FIG. 4, until the longitudinally disposed recesses in the block will accept the bearing pads 40 and the shoulder 38. It can be appreciated that two factors in this bracket will insure aggressive gripping of the block 42 by the arms 34, namely, the presence of the pads 20 will tend to bow the base 12 in such a fashion as to move the extremities of the wall 22 inwardly plus the force against the flanges 32 will provide a moment arm whereby the upper portion of the wall 22 and the arms 34 are moved inwardly and stressed into aggressive gripping relationship to the block.

The base 12 is also provided with suitable means for the purpose of insuring proper orientation for installation with the panel 14. In this particular embodiment the arrowheads 44 of a pair of clips, as shown in FIG. 1, are directed toward one another to insure that there is proper longitudinal spacing between adjacent brackets for the acceptance of the terminal block 42. In the illustrative embodiment the fastening means 16 includes a central rib 50 and a tapered resilient C-shaped shoulder carrying element 52 having its central portion connected to the base 12 and rib 50 while its free ends are unconnected and carry shoulders or abutment means 54 capable of underlying panel 14 for retention of the bracket 10. This fastener 16 is capable of being telescopically snapped into a complimentary aperture 60 having a communicating slot 62, the latter adapted to accept rib 50 for positive orientation of the bracket 10. Additionally, laterally positioned apertures 64 will accept the protuberance means 18 for further orientation stability. In the present embodiment the arms 34 have a width generally coextensive with the second portion 26 of the wall so as to be accepted by the recesses 43 of differing configurations found in all of the terminal blocks presently commercially available on the market. It will be recognized that in certain instances, as where the recess 43 is of substantial axial extent, the arm 34 may be coextensive with the width of the base 12.

A rib 46 that is integral with the base 12 and extending between the two opposed walls 22 will enhance the rigidity of the base 12 and provide the secondary function of spacing the conductors or cables from the panel 14. This enhances the ability of the installer to grip the conductors which are laid in through the throat between the opposed flanges 32 and then fed out between adjacent brackets to be installed in the gripping mechanism of the terminal blocks.

It is contemplated that the brackets shown in the present invention can be injection molded from dielectric materials such as polypropylene or nylon. The selection of materials is one which is based upon the availability of a particular material as well as its characteristics of resiliency and rigidity, dependent upon wall thickness and structural considerations such as ribs, etc.

Secondary clips, not shown, can be utilized to embracingly grip the second portion 26 of wall 22 by underlying the extension 30 and the opposite edge 31 with suitable means, known in the art, and also providing means for gripping conductors or cables along the exterior of the bracket 10 rather than within the arms 22.

I claim:
1. A bracket for retaining a rectilinear terminal block or the like at a stand-off position above a support panel, said bracket including a base adapted to abut said panel, fastening means extending downwardly from said base for retention of the bracket on said panel, a pair of substantially rigid walls extending upwardly from opposite ends of said base, angularly disposed flange means extending from each wall toward the other wall in diverging relationship to the base, relatively short stiffly resilient arm means extending upwardly from the free ends of each of said walls, each arm including a cam lead-in surface terminating in a shoulder intermediate the ends of said arm, said angularly disposed flanges serving the dual function of accepting terminal blocks having varying grip tolerances, as well as to stress said shoulders and walls inwardly into more positive engagement with said terminal blocks when said flanges are depressed.

2. A bracket of the type claimed in claim 1 wherein said base carries at least one means for maintaining orientation of the bracket relative to the support panel to insure proper location and spacing of one bracket relative to other identical brackets used with said panel.

3. A bracket of the type claimed in claim 2 wherein said means is a protuberance adapted to be accepted in a panel aperture to locate the bracket and prevent rotation.

4. A bracket of the type claimed in claim 2 wherein said means is an indicia means for proper orientation of said bracket when mounted on the panel, said indicia means including an arrowhead projection from said base.

5. A bracket of the type claimed in claim 1 wherein each wall includes two portions laterally offset from each other and interconnected by an integral web extending the entire length of said wall.

6. A bracket of the type claimed in claim 5 wherein said flange is integrally connected to both wall portions and web to thereby form a stiff cantilever member.

7. A bracket of the type claimed in claim 5 wherein said arms have a width less than the combined width of the two wall portions.

8. A bracket of the type claimed in claim 5 wherein the outermost wall portion includes a section which extends beyond the juncture with the interconnecting web to thereby provide two oppositely extending edges capable of accepting an embracing gripping element of a secondary fastener.

9. A bracket for retaining a rectilinear terminal block or the like at a stand-off position above a support panel, said terminal block having a base and lateral longitudinally disposed means to accommodate said brackets, said bracket including a generally rectangular base adapted to be mounted adjacent said panel, fastening means extending from one surface of said base for retention of said base on said panel, a pair of walls positioned at opposite ends of said base and extending oppositely from said fastening means, each of said walls having two portions laterally offset from each other and interconnected by a substantially coextensive web portion to form a substantially rigid wall, the free end of each wall carrying flange means extending angularly divergent from said base toward the opposite wall, stiffly resilient arm means extending from the free end of the wall in a direction away from the base, each arm including a cam-like lead-in surface directed toward shoulder means positioned intermediate the extremities of said arm, said flange means when depressed by the insertion of the base of the terminal block acting as a cantilever moment arm transmitting movement to said walls and causing said arms carried by the walls to more aggressively grip the laterally disposed means on said block.

10. A bracket of the type claimed in claim 9 wherein each of said arms including a flat bearing surface substantially normal to said shoulder and positioned intermediate said shoulder and said lead-in surface adapted to bear against a side surface of said terminal block and adapted to insure positionment of said shoulder parallel to a corresponding shoulder on said terminal block.

11. A bracket of the type claimed in claim 9 wherein said base includes a strengthening rib extending substantially between said walls and serving additionally as spacing means to support wires and cables in spaced relation to said base.

12. A bracket of the type claimed in claim 9 wherein at least a pair of brackets are employed in aligned spaced relation to support said terminal block.

13. A bracket of the type claimed in claim 9 wherein said fastening means is integral with said base in a generally central location.

14. A bracket of the type claimed in claim 13 wherein protuberance means are positioned at opposite ends of said one surface and adapted to contact said panel and distort or bow said base to insure positive contact of said fastening means and additionally to flex said walls and arms towards each other for more aggressive gripping of said terminal block.

15. A bracket of the type claimed in claim 1 wherein said fastening means and said support panel include cooperative means for orientation of said bracket.

16. A bracket of the type claimed in claim 15 wherein said fastening means includes rigid means for location in a complimentary shaped aperture in said support panel.

* * * * *